Sept. 21, 1943.  A. P. WINTER  2,329,969
GRAIN WEIGHING AND RECEIVING UNIT
Filed May 10, 1938  6 Sheets-Sheet 1
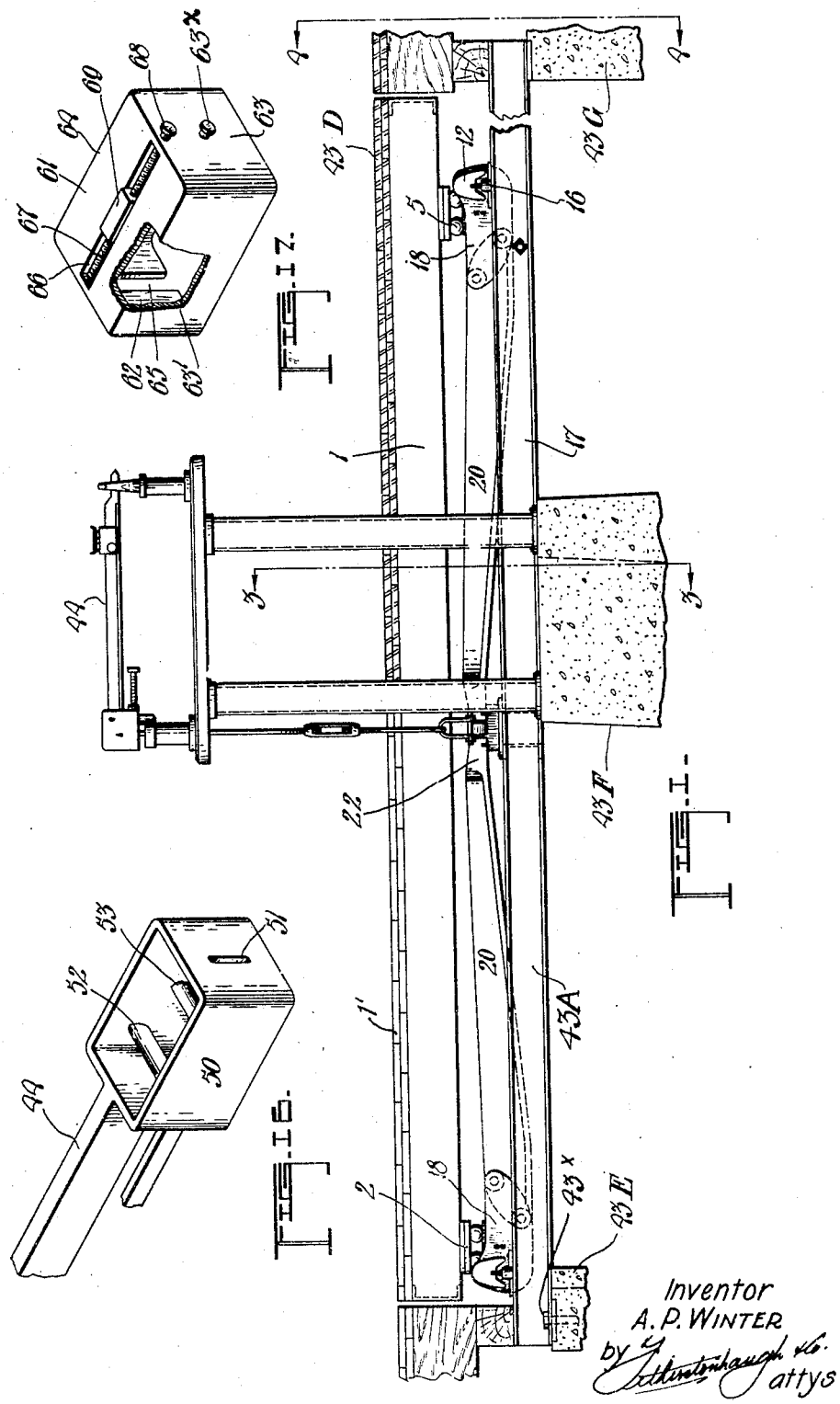
Inventor
A. P. WINTER
by Fetherstonhaugh & Co.
attys

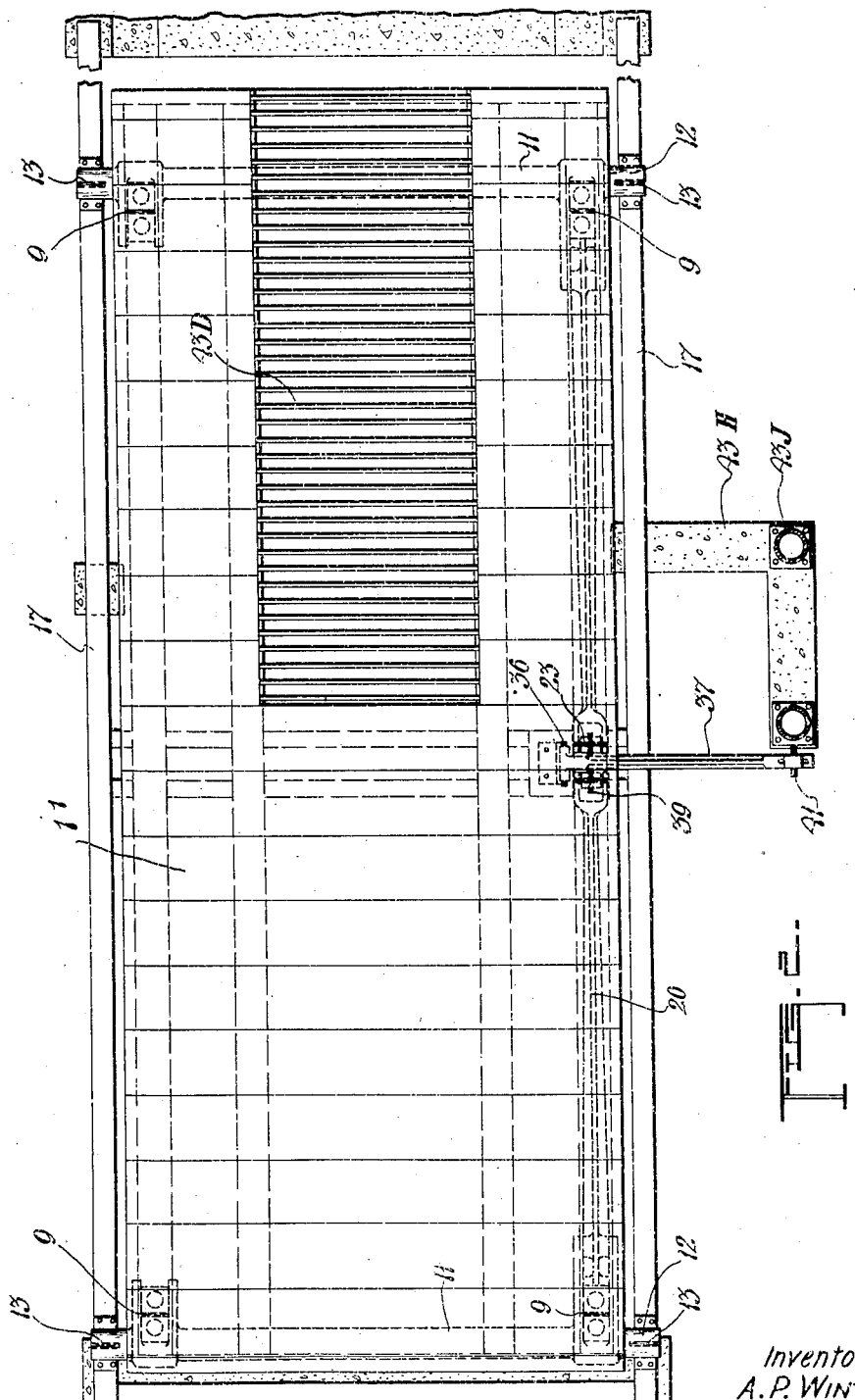

Sept. 21, 1943. A. P. WINTER 2,329,969
GRAIN WEIGHING AND RECEIVING UNIT
Filed May 10, 1938 6 Sheets-Sheet 3
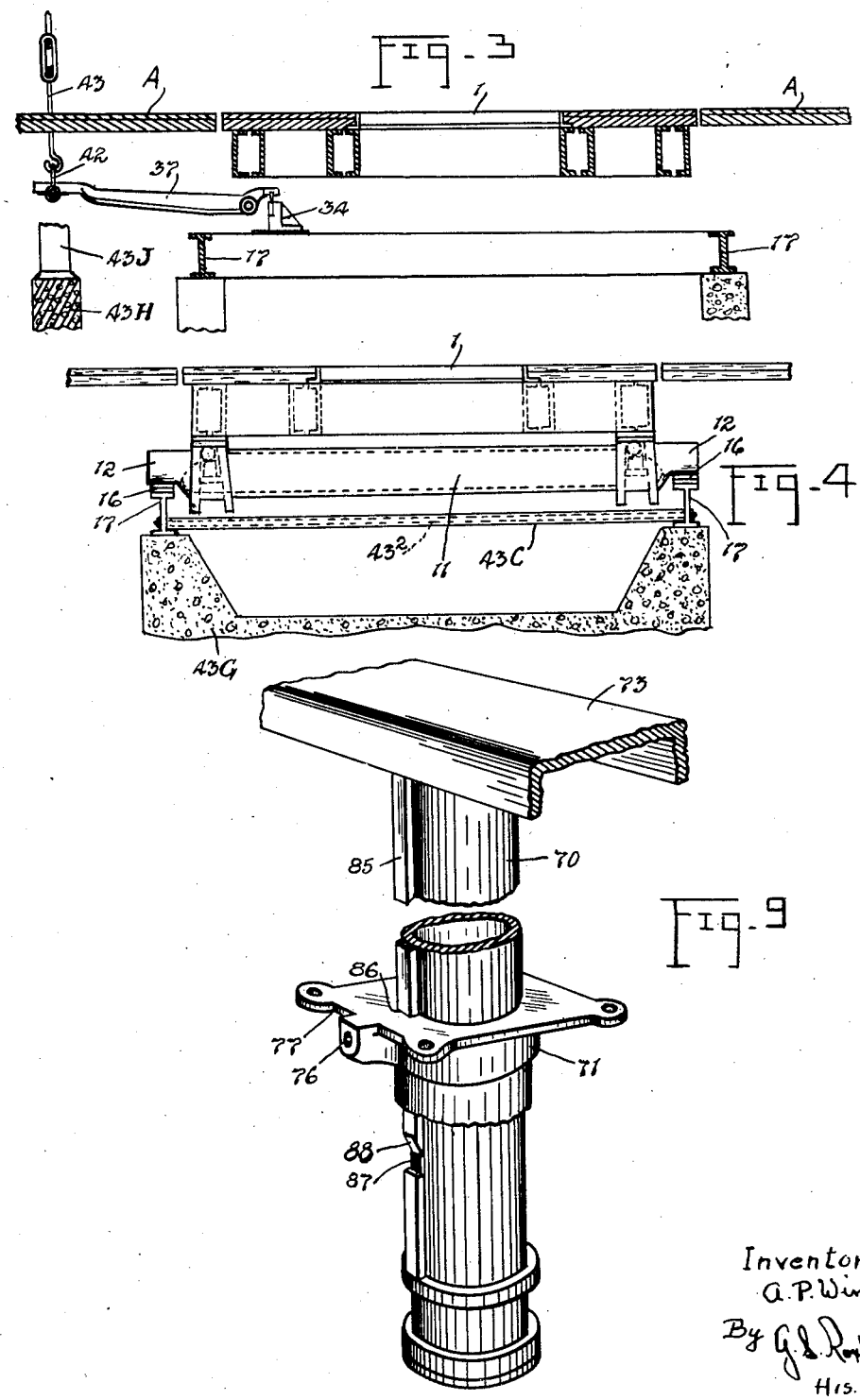
Inventor
A. P. Winter
By G. S. Roxburgh
His Atty Sept. 21, 1943.  A. P. WINTER  2,329,969
GRAIN WEIGHING AND RECEIVING UNIT
Filed May 10, 1938   6 Sheets-Sheet 4
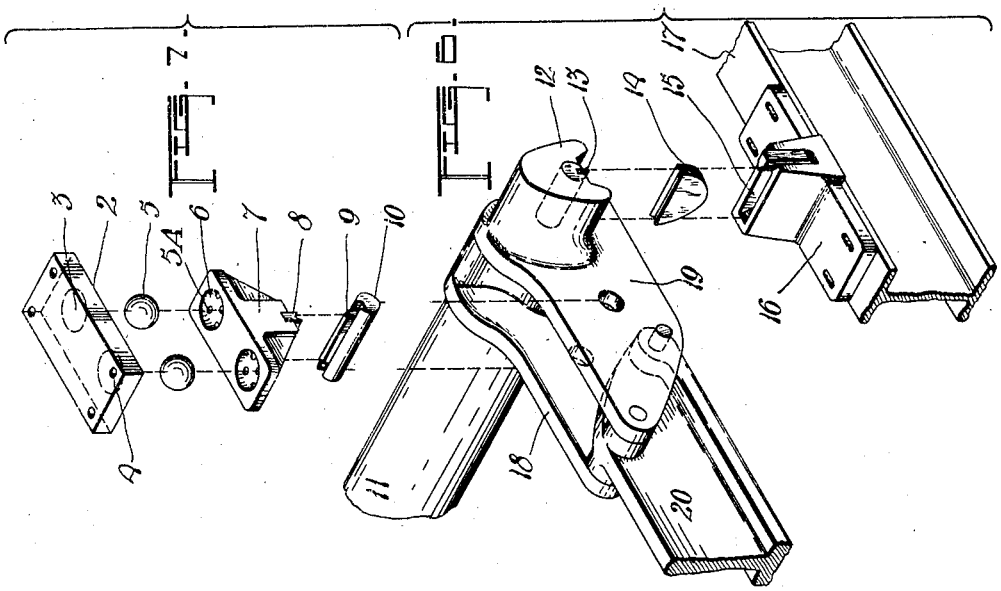
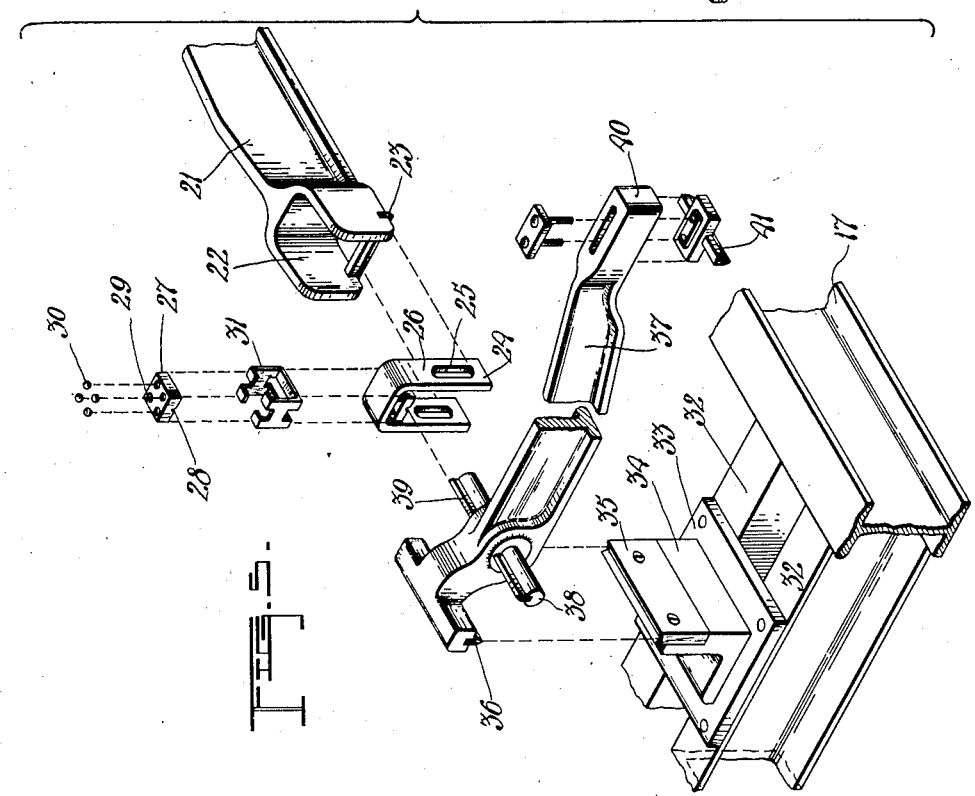
Inventor
A. P. WINTER
by Wilkinsonbaugh & Co.
attys.

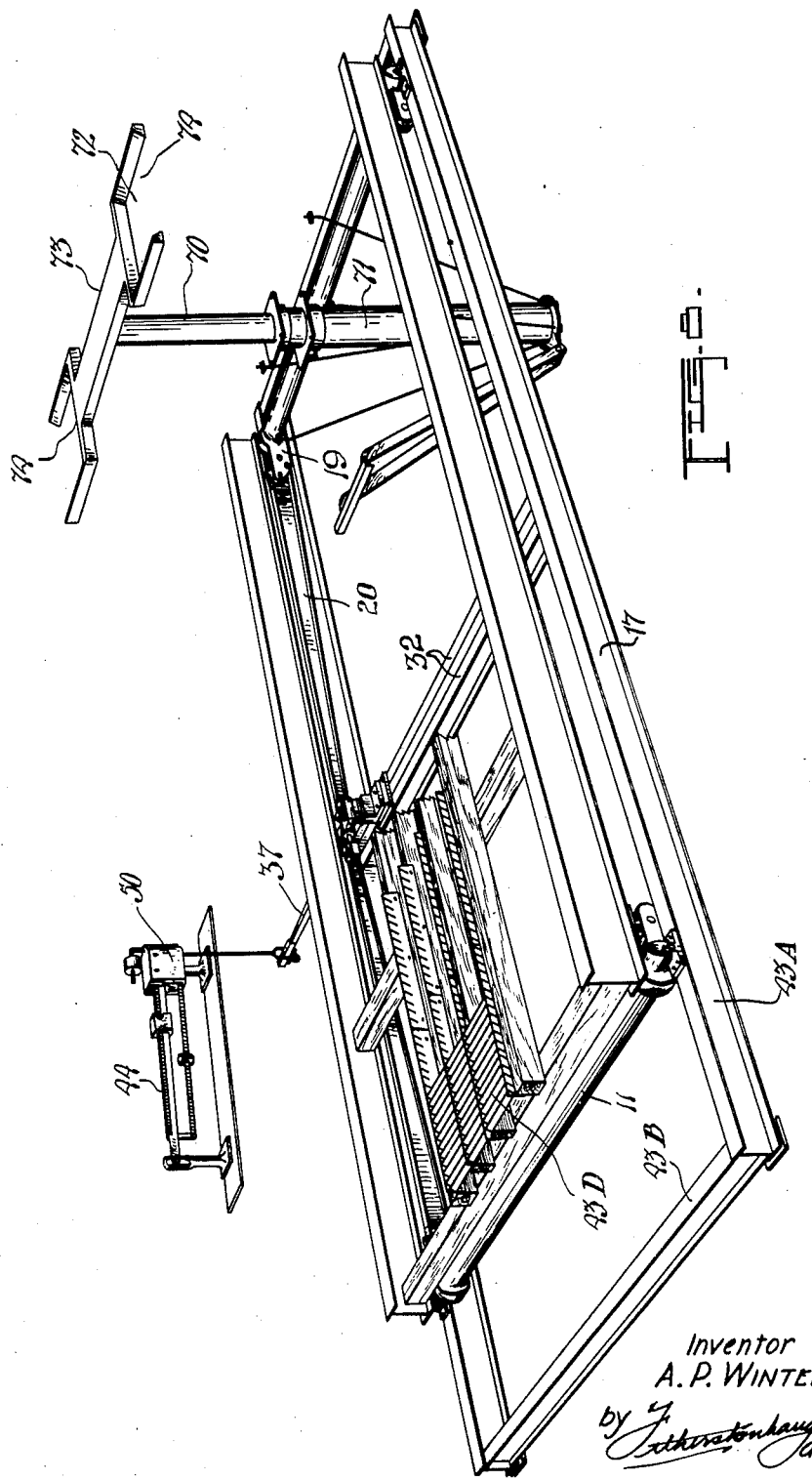

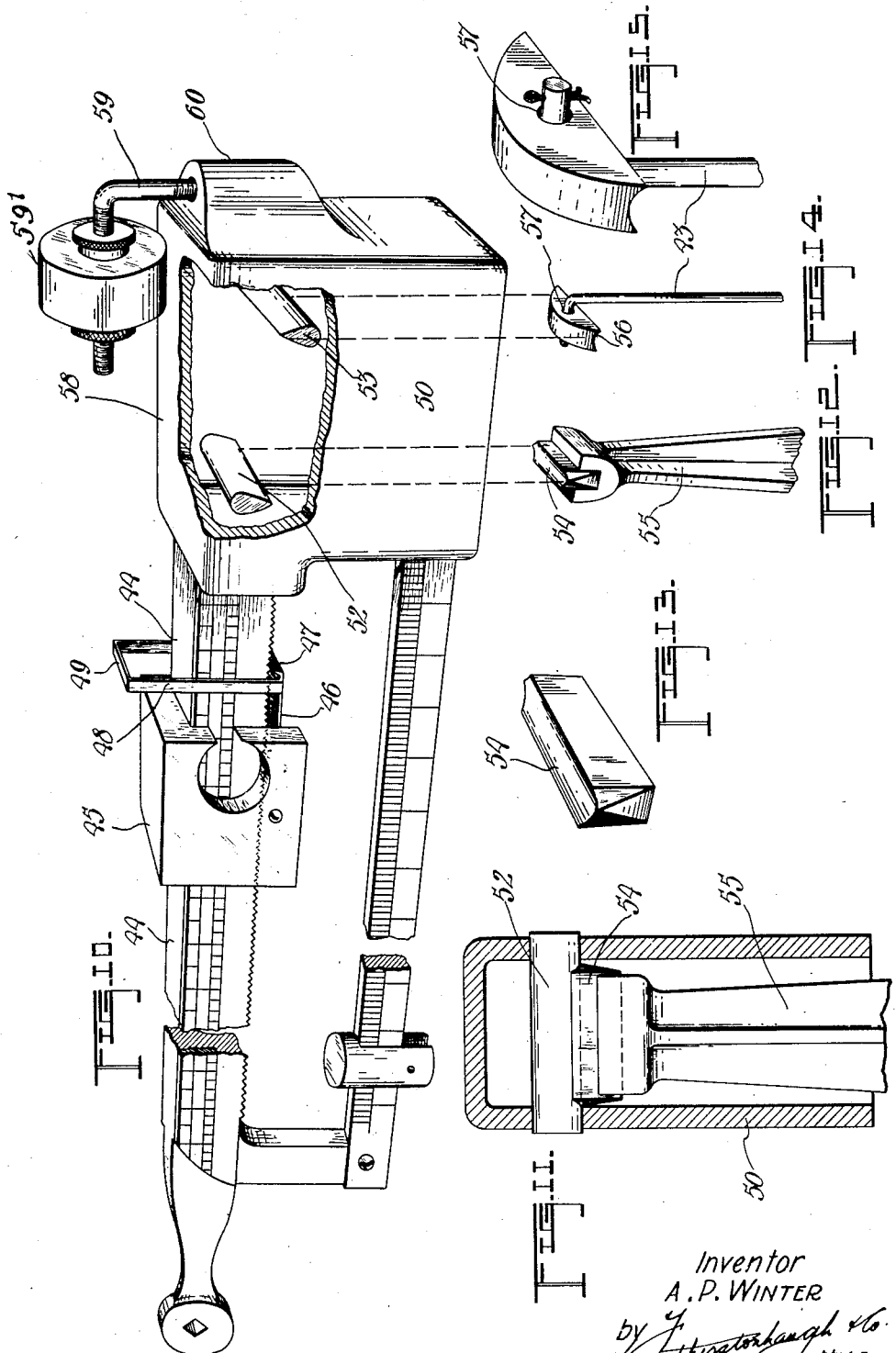

Patented Sept. 21, 1943

2,329,969

UNITED STATES PATENT OFFICE 2,329,969

GRAIN WEIGHING AND RECEIVING UNIT

August P. Winter, St. Vital, Manitoba, Canada

Application May 10, 1938, Serial No. 207,024
In Canada May 10, 1937

14 Claims. (Cl. 265—71)

My invention relates to improvements in grain weighing and receiving units and a general object is to provide a device of the character herewithin described for primary use in grain elevators for the purpose of weighing and dumping grain from vehicles into a suitably built hopper or "pit," the design of the unit being such that it will accurately weigh a full or empty vehicle irrespective of whether the hopper or pit is full of grain or empty.

A further object is to provide a platform scale having the weighing mechanism which underlies the scale platform, so designed that it occupies a minimum of vertical space, thereby reducing the height of the roadway leading to and from the scale and giving greater grain pit capacity.

A further object is to provide a platform scale wherein the transverse or main levers overlying the platform are elliptical in cross section and have their pivot points aligned with the longitudinal axes of the levers and supported by similar bearings all permanently mounted on a rigid foundation frame provided, such minimizing space, permitting of unrestrained movement of the levers whether the pit is full or empty, and insuring of minimum weighing inaccuracies due to shifting foundations.

A further object is to provide a platform scale wherein the platform is mounted at the corners on ball bearings which permit of horizontal vibration in any direction of the platform when a disturbing force is applied, and wherein the bearings are supplied with escape openings for foreign material.

A further object is to provide a platform scale wherein the bearings for the pivots of the main levers are so designed and mounted on the foundation frame that they are self-adjusting to accommodate any mis-alignment occurring in the foundation frame.

A further object is to provide a construction wherein the load pivots supporting the scale platform are inwardly and laterally offset in relation to the extended main lever pivots and are normally contained in the same horizontal plane to further minimize space.

A further object is to provide an arrangement wherein the connections between the long or extension levers and the short lever, permit, in each instance, of universal movement and embody as part of their structure ball bearings providing a floating support for the free ends of the long levers.

A further object is to provide a structure wherein the pivot supports for the main levers and for the short lever are all carried by a rigid foundation frame and wherein the foundation frame is supported by independent intermediate and end piers and wherein the weigh beam stadards pass freely through the floor surrounding the platform and are supported therebelow and further wherein the steel-yard connecting the scale to the weigh beam is attached to the weigh beam by a special construction permitting it to sway in all directions.

A further object is to provide the weigh beam with an over balance adjusting mechanism and with a range controlling mechanism, both of simple construction and readily adjustable accurately.

A further object is to provide a foundation frame carried by independent end and intermediate piers and wherein the said frame is permanently anchored to one of the end piers and is free to move in relation to the other piers.

The above constitutes some of the more important objects to be derived from the use of my invention but several additional objects and advantages will be revealed to those skilled in the art to which this invention appertains following a perusal of this specification taken in conjunction with the drawings accompanying this application and upon construction of the receiving unit described and illustrated therein. It is therefore to be understood that I am not limited in the scope of protection afforded to the extent of the foregoing objects or to such objects as may later be set forth, these being only illustrative of some of the outstanding advantages of my structure.

My invention therefore consists in the arrangement and construction of parts all as hereinafter described and illustrated in the accompanying drawings, in which:

Fig. 1 is a side elevation of my platform scale.

Fig. 2 is a plan view of Figure 1.

Fig. 3 is a section upon the line 3—3 of Figure 1.

Fig. 4 is a section upon the line 4—4 of Figure 1.

Fig. 5 is an extended perspective view of my weigh scale center balancing mechanism.

Fig. 6 is a perspective view of my end balancing mechanism.

Fig. 7 is an extended perspective view of my weigh scale corner balancing mechanism.

Fig. 8 is a perspective view of my dumping mechanism in situ upon a platform scale.

Fig. 9 is a perspective view of my piston column showing a portion of the cylinder broken.

Fig. 10 is a perspective part sectional view of my weigh beam.

Fig. 11 is a cross section of my weigh beam fulcrum point at the fulcrum point.

Fig. 12 is a perspective view of my weigh beam supporting column.

Fig. 13 is a perspective view of the bearing located at the apex of my weigh beam supporting column.

Fig. 14 is a perspective view of my universal weigh beam steel-yard assembly.

Fig. 15 is an enlarged perspective view of the opposite side of my steel-yard assembly.

Fig. 16 is an extended perspective view of my weigh beam housing.

Fig. 17 is a perspective view of my preferred range controlling mechanism.

In the drawings like characters of reference indicate corresponding parts in the different figures.

In describing my receiving unit, I will first describe my platform scale illustrated in Figures 1 to 7. The rectangular scale platform proper 1, which is composed of a plurality of side and end beams and decked with boards 1' is provided at its four corners with bearing blocks 2 permanently secured thereto, (Figure 7), these blocks being provided upon their under surface with semi-spherical recesses 3.

Each of these blocks rests with its recesses 3 upon ball bearings 5, which in turn, rest in a pair of semi-spherical sockets 6 formed in a cast saddle 7 of the configuration clearly shown in Figure 7, and each socket is provided with refuse passages 5A. Each saddle is provided upon its lower surface with a transverse recess in which is located a concaved bearing 8 which receives a primary knife edge load pivot 9 mounted in a longitudinally slotted cross pin 10.

At each end of the scale platform and underneath the same, I provide a hollow transverse main lever 11 of symmetrical cross-section, which is provided at each end with a trunnion 12 of the configuration clearly shown in Figure 6. Secured within each of these trunnions is a fulcrum pivot 13 which rests in a freely floating semicircular gland scale pivot seating 14 mounted in a complementarily formed recess 15 in a carrier 16 secured to the foundation frame 17, the fulcrum pivot 13 being located on the neutral axis line of the main lever 11.

By forming and mounting the main levers in the above manner, the rocking movement of the said levers will encounter only the frictional resistance of any granular material in which they may become either partially or wholly embedded.

Pairs of spaced, parallel, horizontally disposed, similar side arms 18 and 19 extend inwardly from the ends of the levers 11 and underlying one side of the platform, I locate two similar, horizontally disposed, side or extension levers 20, such being secured permanently to the pairs of arms 18 and 19 at that side of the platform.

The cross pins 10 are mounted in bearings provided in the arms 18 and 19, and from the foregoing, it will be seen that the inertia of the scale platform, resting as it does upon the bearing blocks 2, causes the side levers to bear downwardly at their inner ends 21 (Fig. 5). These inner ends are also bifurcated as at 22, a knife edge pivot or "nose iron" 23 spanning the bifurcation of each lever.

A clevis 24 is associated with each side lever and is provided with elongated slots 25 in each of its down-turned side arms 26 and the knife edge pivots 23 bear in each instance on the lower ends of the slots. The cross piece of each clevis 24 carries the block 27 which engages with the knife edge pivot 39 later referred to.

Each block 27 is provided with an elongated knife edge bearing 28 upon its under surface to receive an underlying pivot later referred to, and upon its upper surface is provided with four semi-spherical cavities 29 to receive ball bearings 30, the said clevis 24 resting upon these balls in the manner clearly illustrated.

For installation purposes and for dust exclusion, I retain each bearing block in position within the clevis by means of a pressed steel cage 31 of the configuration clearly shown in Figure 5, the bearing block being free to float within the clevis due to the ball bearings and I also provide against movement of the ball bearings out of their sockets during installation or transportation by the provision of a brass plate or other packing arrangement (not shown).

Included in the foundation frame are members 32 extending transversely from side to side and centrally beneath my scale platform, these members consisting of channel beams, and across these beams at one end, I secure a plate 33 upon which is superimposed a stiff bracket 34. This bracket is preferably rabbetted out to receive more securely the central knife edge bearing 35, which bearing supports the knife edge pivot or short lever fulcrum 36, extending transversely across the inner end of the short lever 37.

Also extending transversely of the longitudinal axis of the short lever, is a longitudinally slotted cross pin 38 in which is secured an up-turned knife edge short lever load pivot 39. The portions of the load pivot extending on each side of the short lever engage the bearing 28 of the blocks 27 and from the foregoing arrangement, it will be seen that normally a force will be acting downwardly on the free end 40 of the lever 37.

Upon the under side of the free end of the short lever is a transverse, down-turned knife edge pivot 41 which engages with a bearing provided in a clevis 42 attached to my weigh beam steel-yard 43 as illustrated in Figure 3 and further in Figure 15.

Before concluding the description of my platform scale proper, I would draw particular attention to the fact that the load pivots 9 are inwardly and laterally offset with respect to the fulcrums 13, this arrangement being a very important and novel feature in my platform scale.

In Figure 8, I show the scale platform 1 as being composed of parallel, longitudinally extending side beams having cross-tying members extending therebetween to maintain platform rigidity, and occupy only the depth of the said beams. These beams, together with the cross tie members, carry the deck grating and also the hoist.

In this figure also I show clearly the scale platform as overlying the foundation frame 17 which is formed from the longitudinally extending side beams 43A, the inter-connecting end beams 43B and the centrally located cross beams 32.

By further reference to Figure 8, it will be noticed that the beams 43B extend beyond the ends of the scale platform, the reason for this being to provide suitable means for carrying the external runway platform on the same foundation, so that there will be corresponding movement in the scale and in the runway platform in the event of action by frost, heaving and the like.

In Figure 4, it will be noted that I also provide a pipe 43C between the beams 43A, this pipe having a rod 43² extending therethrough and through drillings in the beams to which it is fastened by nuts on the outer side. I utilize this means of tying the latter beams only when space necessitates shortening the beams to the length of the platform, the reason for its use under these conditions being due to the fact that it is then in close proximity to the main lever 11 and does not constitute an obstruction to the flow of grain through the grate 43D.

In Figures 1, 2, 3 and 4, I have shown details of my novel foundation structure which is essentially a self-anchored structure as will be hereinafter described, the same consisting of a number of concrete piers 43E, 43F and 43G (see Figure 1), these piers being in turn anchored against action by frost by piling preferably extending to bed rock.

By reference to Figures 2 and 3, it will be observed that the pier 43F extends outwardly as at 43H to carry the weigh beam supporting standards 43J, so that in the event of movement of the latter pier, the weigh beam supporting standards will be carried therewith to a corresponding extent, thus preventing the possibility of individual separation. It will be particularly noted that the latter standards pass freely through the usual scale floor A located at the side of the platform.

By reference to Figure 1, it will be seen that the forward ends of beams 43A (opposite the grate end of the platform scale) are anchored to the concrete end pier 43E such as by bolts 43×. At the opposite end, however, it will be noted that the beams are not anchored to the pier 43G, this end merely resting thereon, so that the rear ends of the beams may slide over the pier 43G in the event of separation of the piers 43E and 43G.

I will now proceed to a description of my weigh beam mechanism, this being illustrated in Figures 10 to 17 of the drawings accompanying this application. This weigh beam mechanism which is carried by the standards 43J consists of a scale beam 44 provided with a counterpoise 45, the counterpoise being open upon its under side as at 46 and provided with a spring dog 47 which may be secured to the sides of the recess or suitably secured at one end of the counterpoise beneath the scale beam by screw means.

Extending upwardly from the edges of this dog upon either side of the scale beam, I provide a pair of arms 48 between the free ends of which I provide a finger pawl 49.

From the foregoing, it will be seen that the counterpoise is easily moved along the scale beam by manual operation of the pawl which by a slight movement downward, disengages the spring dog from notches provided upon the underside of the scale beam and with which the up-turned end of said dog engages. The weigh beam knife edge housing 50 is permanently attached to one end of the scale beam 44 and consists of a four sided boxing provided in the embodiment shown in Figure 16, with a vertical slot 51 in the rear end thereof.

Extending across, within the boxing and transversely with respect to said scale beam, I provide a knife edge pivot 52 and a knife edge bearing 53, the pivot 52, which is the weigh beam pivot, being down-turned and the bearing 53, which constitutes the weigh beam load bearing, being up-turned. The pivot 52 rests upon a bearing 54 secured in the apex of the weigh beam supporting column 55 and upon the knife edge bearing 53 is mounted a head 56 through the body of which is a transverse drilling 57, illustrated by Figures 12–14.

Journalled freely within this drilling 57 is the upper angulated end of my steel-yard rod 43 and from the arrangement illustrated and described, it will be seen that the same is universally mounted being free to swing in all directions.

In Figure 10 of the drawings accompanying this application, I show the weigh beam housing as provided with a top closure plate 58 and with an over balance adjusting mechanism, and a range controlling mechanism, such latter consisting of an L-shaped threaded rod 59 having one end adjustably screw threaded into an internally threaded projection 60 formed in the rear wall of the housing and the other horizontal end supplied with a counterbalance weight 59' adjustably mounted thereon.

My preferred embodiment, however, is that illustrated in Figures 16 and 17, of which the boxing 50 has already been described. In this embodiment, the over balance adjusting mechanism and the range controlling mechanism present a vertically movable shell 61 consisting of a front end wall 62, a rear end wall 63, and a top plate 64, the end walls fitting snugly over the end walls of the boxing 50.

It will be noted that the front wall of this shell is formed with a vertical slot 65 to receive the scale beam 44 and that the rear wall thereof is provided with a bolt 63× which extends through the wall 63 and through the slot 51 of the boxing 50. From this arrangement, it will be seen that one may slacken the bolt and then reset the shell in a higher or lower position as desired to control the range line.

To provide for balance in this arrangement, the top plate 64 is centrally and lengthwise slotted as at 66 and the slot receives a non-endwise shiftable, rotatably mounted shank 67 carried by the end walls and provided with a finger piece 68. Upon the shank, I mount the adjustable balance weight 69 which consists of an elongated squared, internally and longitudinally drilled and threaded block of approximately equal width to that of the slot 66.

From this arrangement, it will be seen that upon rotation of the finger piece 68, the shank 67 will be rotated and the weight will be moved horizontally to the left or right within the slot 66. Although I have stated that my over balance adjusting mechanism embodies the front and rear walls 62 and 63 and a top plate 61, it may also have side plates 63' connecting the front and rear walls.

The advantages of this arrangement over the first described embodiment resides in the fact that the balance cannot be accidentally moved out of adjustment.

The grain weighing and receiving unit is provided with a hydraulic hoist which forms the subject matter of a divisional application filed under Serial Number 257,348 on the 20th day of February, 1939, and which is herein briefly described so that the general utility of the device may be better understood. The hoist embodies a cylinder 71 suspended from the scale platform, a piston 70 slidably mounted in the cylinder and a wheel support 72 which presents a cross bar 13 having forked ends 74 forming cradles to receive the front wheels of a vehicle being weighed on the platform, this latter occurring when the hoist is in its down position.

Since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:

1. In a weighing device, in combination, a substantially rectangular rigid foundation frame, a pair of main levers having the ends thereof crossing the sides of the frame, means supporting the ends of the levers from the sides of the frame and embodying dual pivots permitting of a rocking movement of the levers around their geometric longitudinal axes and of a vertical tilting movement of the levers in respect to the frame, pairs of load, pivot carrying, supports carried by the levers and having the pivots thereof inwardly and laterally offset in relation to the former pivots, horizontally disposed extension levers extending inwardly from a pair of the latter supports on each of the main levers and permanently secured thereto, platform supports pivotally carried by said load pivots and a platform carried by said latter supports.

2. In combination, an extension lever having a forked end provided with a transverse pivot, an upstanding clevis spanned by the fork and provided with bearings for the pivot and a floating bearing carried by the upper portion of the clevis.

3. The combination with the opposing forked ends of a pair of pivoted long levers and an end pivoted short lever extending transversely between the ends of the former levers, of a clevis pivotally carried by each fork, a floating bearing mounted in the upper portion of each clevis, and a pivot engaging each bearing and extending from the sides of the short lever.

4. The combination with the opposing forked ends of a pair of pivoted long levers and an end pivoted short lever extending transversely between the ends of the former levers, of an upstanding clevis spanned by each fork and having vertically slotted side arms, a knife edge pivot carried by each fork and bearing in the lower ends of the slots, a floating bearing mounted in the upper end of each clevis, and aligned knife edge pivots extending from the sides of the short lever and engaging the latter bearings.

5. The combination with the short lever, the weigh beam and a knife edge bearing carried by the latter, of an upstanding steel-yard pivotally attached to the short lever and having the upper end thereof bent to transversely overlie the bearing, and a head pivotally receiving the bent end of the yard and pivotally mounted on the bearing.

6. In combination, parallel transverse end pivoted main levers having the pivot points located at the longitudinal axis of the levers, inwardly extending, horizontal lying, pairs of load pivot supports carried by the levers and positioned to the inner side of the former pivots, aligned horizontally disposed side levers permanently secured to a pair of the load pivot supports on each of the main levers and a pivoted short lever extending transversely between the free ends of the long levers and pivotally coupled thereto.

7. A weighing device including a transverse main lever normally imbedded in the granular material being weighed, said lever being of symmetrical cross section and being fulcrumed at its ends to rock on the longitudinal axis of the lever whereby rocking movement of the lever encounters only frictional resistance of the granular material.

8. A weighing device including a transverse main lever normally imbedded in the granular material being weighed, said lever being of symmetrical cross section and being fulcrumed at its ends to rock on the longitudinal axis of the lever whereby rocking movement of the lever encounters only frictional resistance of the granular material, and load pivots carried by the lever and inwardly and laterally offset in relation to the fulcrums aforesaid.

9. A weighing device including a transverse main lever normally imbedded in the granular material being weighed, said lever being of symmetrical cross section and being fulcrumed at its ends to rock on the longitudinal axis of the lever whereby rocking movement of the lever encounters only frictional resistance of the granular material, a platform overlying the lever and load pivots supporting an end of the platform, said load pivots being inwardly and laterally offset in relation to the fulcrums aforesaid.

10. In a weighing device, the combination with a short lever, a scale beam and knife edge bearing carried by the latter, of an upstanding steel-yard having the lower end pivotally attached to the short lever and the upper end thereof supported from the knife edge bearing in a manner to permit of a universal swinging movement of the lower end of the steel yard.

11. In a scale, the combination with opposing frame members and independent piers supporting said frame members, of similar opposing standards secured to the frame members, semi-circular glands having concaved top faces mounted in receiving complementary semi-circular recesses provided in the standards, said recesses being vertically disposed and extending in a direction transversely of the frame members, a main lever having the ends thereof overlying the glands and aligned knife edge pivots secured to the ends of the lever and bearing on the concaved top faces of the glands.

12. The device as claimed in claim 11 wherein the knife edge pivots are located at the longitudinal axis of the main lever.

13. In a scale, a mounting for the ends of a transverse main lever, comprising aligned knife edge pivots secured to the underside of the lever ends, aligned semi-circular glands forming bearings for the pivots and similar supporting standards provided with semi-circular grooves complementary to and partially receiving the glands.

14. In a weighing device, independent end and intermediate supporting piers anchored against frost action, a rigid foundation frame resting on said piers, and weigh-beam supporting stand, outside the frame, extending down to and carried by said intermediate pier.

AUGUST P. WINTER.